No. 630,281. Patented Aug. 1, 1899.
H. W. ALDEN.
BRAKE.
(Application filed July 26, 1898.)
(No Model.)
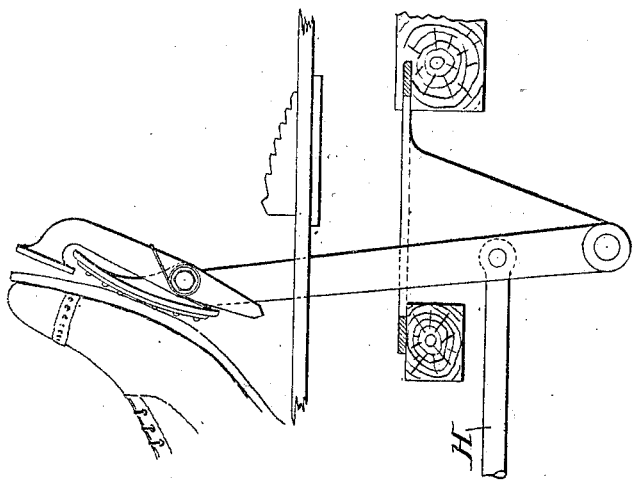
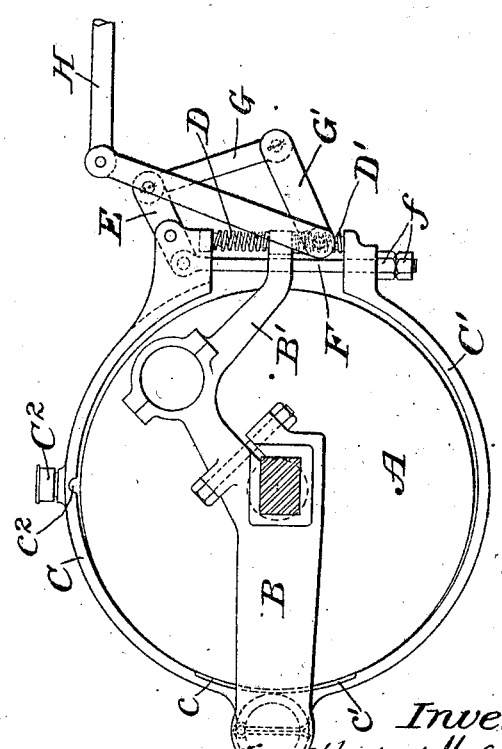
Attest:
A. N. Jesbera.
E. M. Taylor.
Inventor:
Herbert W. Alden
by Redding, Kiddle & Greeley
Attys.

UNITED STATES PATENT OFFICE.

HERBERT W. ALDEN, OF HARTFORD, CONNECTICUT, ASSIGNOR, BY MESNE ASSIGNMENTS, TO THE COLUMBIA AND ELECTRIC VEHICLE COMPANY, OF JERSEY CITY, NEW JERSEY.

BRAKE.

SPECIFICATION forming part of Letters Patent No. 630,281, dated August 1, 1899.

Application filed July 26, 1898. Serial No. 686,953. (No model.)

*To all whom it may concern:*

Be it known that I, HERBERT W. ALDEN, a citizen of the United States, residing in the city and county of Hartford, in the State of Connecticut, have invented certain new and useful Improvements in Brakes, of which the following is a specification, reference being had to the accompanying drawing.

The objects of this invention are to produce a brake which shall operate with equal effectiveness whether the part to which it is applied be rotating in one direction or in the other and in which the dragging of the ordinary band-brake shall be avoided, and generally to improve the construction and operation of brakes of the class known as "band-brakes."

The nature of the invention will be more particularly pointed out hereinafter with reference to the accompanying drawing, in which the invention is illustrated as embodied in a desirable construction.

The drawing is a view in side elevation of the improved brake mechanism applied to a brake-wheel, the brake-operating device being also shown.

In the drawing the brake-wheel, which is secured to a rotating part of the machine or vehicle or its driving mechanism, is represented at A, and a rigid portion or frame member of the machine or vehicle is shown at B. To such frame member or to a stud $b$ thereon is secured the brake-band, preferably continuous from end to end, but which comprises, in effect, two members C and C', each one of which extends from the anchor portion at $b$ nearly to the diametrically opposite point of the brake wheel or drum. The rigid frame member or an arm B' is extended to a point between the free ends of the two brake members C and C' to afford a bearing-point for the means which operate to repel the free ends of the brake members, so that both of said brake members normally shall be free from the surface of the brake wheel or drum, such means consisting in the present instance of spiral springs D D', which act, respectively, upon the brake members C and C'.

In order to secure a better action of each brake member, and especially to permit each brake member to embrace so large a part of the surface of the brake wheel or drum as nearly one-half, and yet to clear the surface of the drum when the brake is released, as well as to increase its elasticity, each brake member is cut away on its inner side for a short distance from the anchorage-point, as indicated at $c$ and $c'$, respectively.

In order to pull both ends of the brake-strap toward the center with equal force, so that the brake shall operate in the same manner regardless of the direction of rotation of the drum, a lever E is pivoted at a middle point upon the end of one of the brake members, as C, and one end is connected by a link or rod F with the free end of the other brake member, as C', the end of said link being threaded and provided with nuts, as at $f$, to permit of adjustment. The other end of the lever E is connected to the brake-actuating mechanism by such means as will permit force to be applied to said lever E in the proper direction, as by means of a link G, a bell-crank lever G', and a rod H.

One of the brake members, as C, may be provided, if desired, with a lubricator $C^2$ and formed on its inner surface with transverse grooves $c^2$ to distribute the lubricating material equally over the surface of the drum.

It will be readily understood from the foregoing description of the construction that whenever force is applied to the free end of the lever E in the proper direction both of the brake members C and C' will be pulled toward the middle point and into contact with the surface of the drum with equal force regardless of the direction of rotation of the drum, and that upon the release of the pressure both brake members will be repelled equally from the middle point by the action of the springs against the abutment afforded by the interposed rigid frame member or arm and that both will be freed from the surface of the drum. The cut-away portion of the brake members insures the clearance thereof from the surface of the drum throughout the entire length of their effective surfaces, leaving the brake-band entirely clear at all times in the vicinity of the anchorage.

I claim as my invention.

1. The combination of a brake-band anchored at a middle point, devices for drawing the free ends of said brake-band together, a rigid member of the frame extended between said free ends of the brake-band, and means acting against said free ends with said rigid member as an abutment or support to repel said free ends, substantially as shown and described.

2. The combination with a brake-drum and a frame, of a brake-band continuous from end to end and anchored to said frame at a middle point and cut away on its inner surface for a short distance from such middle point on each side thereof, whereby the brake-band embraces nearly the whole surface of the drum but clears the drum near the anchor and is elastic, substantially as shown and described.

3. The combination of a brake-band anchored at a middle point, devices for drawing the free ends of said brake-band together, a fixed abutment supported by the frame and means reacting upon said fixed abutment to repel the free ends of the brake-band, substantially as shown and described.

This specification signed and witnessed this 28th day of June, A. D. 1898.

H. W. ALDEN.

In presence of—
 H. E. HART,
 W. B. GREELEY.